(12) United States Patent
Hall

(10) Patent No.: US 6,712,024 B1
(45) Date of Patent: Mar. 30, 2004

(54) APPARATUS FOR ARTIFICIAL REEF

(76) Inventor: John W. Hall, 766 Downtowner Loop West, Mobile, AL (US) 36609

( * ) Notice: Subject to any disclaimer, the term of this patent is extended or adjusted under 35 U.S.C. 154(b) by 0 days.

(21) Appl. No.: 10/412,401

(22) Filed: Apr. 12, 2003

Related U.S. Application Data

(63) Continuation of application No. 10/054,658, filed on Jan. 24, 2002, now abandoned.

(51) Int. Cl.⁷ .............................................. A01K 61/00
(52) U.S. Cl. ...................................................... 119/222
(58) Field of Search ................................ 119/222, 221, 119/223; 405/15, 21, 23, 26, 25, 35, 24

(56) References Cited

U.S. PATENT DOCUMENTS

| | | | | |
|---|---|---|---|---|
| 4,095,560 A | * | 6/1978 | Laurie et al. | 119/222 |
| 4,130,994 A | * | 12/1978 | Van Moss, Jr. | 405/24 |
| 4,334,499 A | * | 6/1982 | Baass | 119/222 |
| 5,213,058 A | * | 5/1993 | Parker et al. | 119/208 |
| 5,238,328 A | * | 8/1993 | Adams et al. | 405/183.5 |
| 5,370,476 A | * | 12/1994 | Streichenberger | 405/25 |
| 5,807,023 A | * | 9/1998 | Krenzler | 405/21 |
| 6,042,300 A | * | 3/2000 | Walter | 405/29 |
| 6,276,301 B1 | * | 8/2001 | Pederson | 119/222 |
| 6,408,791 B1 | * | 6/2002 | O'Dell | 119/221 |

* cited by examiner

*Primary Examiner*—Yvonne R. Abbott
(74) *Attorney, Agent, or Firm*—George L. Williamson

(57) ABSTRACT

The present invention disclosed an artificial reef system having a plurality of tire casings tethered onto a cable-like line which reef system is supported in an upright position by a flotation device and which artificial reef system is anchored to the bottom of the ocean by another tire casing filled with concrete having an anchoring device disposed on its underside. The cable-like line may be monofilament. The reef system of tire casings is disposed upwardly due to the buoyancy of the flotation device and is free to move with the current in a natural manner to the extent that the cable-like allows. The flotation device may have a rigid wall so that it maintains its surface displacement when subjected to underwater pressure.

12 Claims, 3 Drawing Sheets

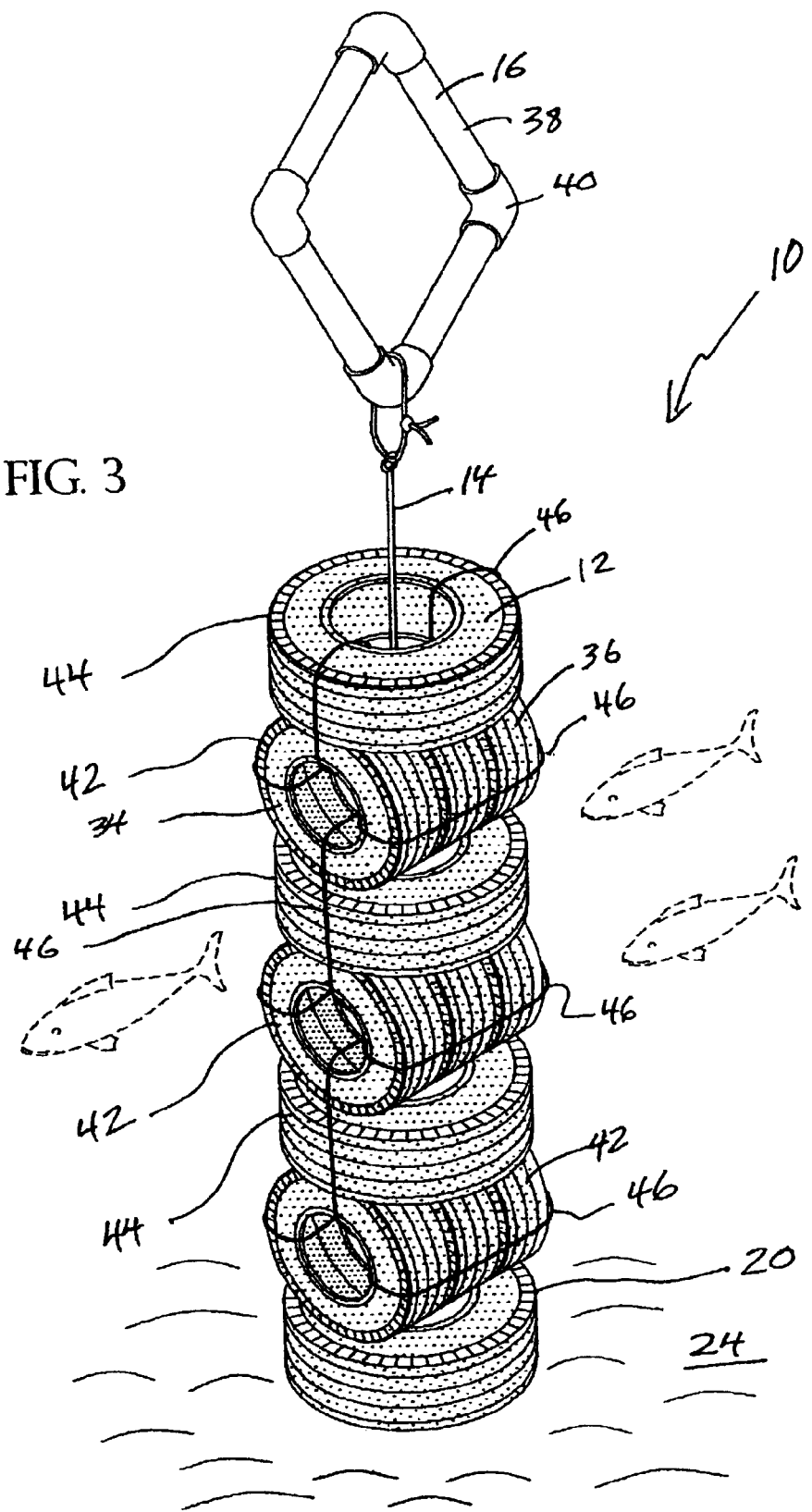

APPARATUS FOR ARTIFICIAL REEF

This application is a continuation in part of U.S. application Ser. No. 10/054,658 filed on Jan. 24, 2002, now abandoned.

BACKGROUND OF THE INVENTION

1. Field of the Invention

The present invention generally relates to artificial reefs, and, more particularly, is concerned with an artificial reef system composed of vehicle tires.

2. Description of the Prior Art

Artificial reef systems have been described in the prior art. However, none of the prior art devices disclose the unique features of the present.

In U.S. Pat. No. 6,408,791 B1 dated Jun. 25, 2002, O'Dell disclosed an artificial underwater habitat comprising a structure with a downwardly opening cavity and an upwardly opening cavity including buoyancy means and ballast means. The habitat is preferably constructed in part by used tires. The habitat preferably maintains an upright orientation from the bottom of a body of water to provide an aquatic ecosystem and aquatic food chain at differing depths. The upright orientation of the habitat also minimizes the effect of silting on the habitat. The buoyancy means includes a novel structure for pressurized gas filled containers.

In U.S. Pat. No. 5,807,023, dated Sep. 15, 1998, Krenzler disclosed an artificial reef that can provide a safe haven for small aquatic life and promotes phytoplankton growth, of which phytoplankton is food for the small aquatic life. The reef includes at least one tubular vehicle tire having a wall that defines an exterior and a hollow interior. The wall includes oppositely situated sidewalls that are interconnected by a treadwall to provide a substantially U-shaped radial cross-section. At lease one elongated corrodible iron insert is inserted through each wall. Each insert has a first end, a second end and a center. The first end extends into the hollow interior; the center is securely positioned through wall between the exterior and the interior, and the second and extends externally of the exterior. The insert is preferably a pail but may be a staple or other shape. The inserts may have varying iron contents to control the insert corrosion rates. In use, the inserts corrode to promote rapid phytoplankton growth. Additionally the phytoplankton consumes carbon dioxide during the rapid growth. The hollow interior provides a safe haven for the aquatic life that feed on the phytoplankton.

In U.S. Pat. No. 4,947,791, dated Aug. 14, 1990, Laier, et al., disclosed an artificial reef for marine life consisting of a system of flexible, buoyant geometric bodies. The bodies are each walled members formed of a plastics material and having a large plurality of holes or openings therein. Each of the bodies is buoyant and is anchored on the sea floor via respective variable length cable so that the bodies float within the water at various elevations. The bodies may be formed of the same size and shape or different sizes and shapes, with the openings therein also being of the same shape or different shapes and sizes. In certain embodiments the bodies are telescoped within each other, and in other embodiments the bodies are interconnected together in a manner such that their axes are in a nonparallel relationship to each other.

In U.S. Pat. No. 5,370,476, dated Dec. 6, 1994, Streichenberger, et al., disclosed a low relief artificial reef made of one or more threads of automobile tires partially buried in a sedimentary bottom and partially protruding above it. The artificial reef can be built on land and conveyed floating to the site of installment. It can also be built on a boat and dropped directly onto the water bottom.

In U.S. Pat. No. 4,139,319, dated Feb. 13, 1979, Anderson disclosed a flexible monolithic mat of motor vehicle rubber tires woven together with eaving reinforcing holding rods and concrete comprising: a plurality of rubber tires arranged in a horizontal plane comprised of at least four tires tangent to each other with each tire being tangent to at least two of the other tires, each tire having a concrete rim form in the area normally occupied by the steel rim when the tire is used on an automobile, each form being filled with concrete and the area bound by the plurality of tires being filled with concrete, reinforcing rods arranged in the concrete and extending between at least two of the tires, the reinforcing rods which extends between any two of the tires crossing the reinforcing rods of the other two tires, the reinforcing rods extending along a horizontal plane and being approximately midway of the concrete in the rim and passing from the body of the tire into approximately the mid portion of the concrete bound by the plurality of tires and passing from the body of the other tire of the at least two tires and into approximately the mid portion of concrete in the rim of the other tire.

In U.S. Pat. No. 5,113,792, dated May 19, 1992, Jones, et al., disclosed an improved artificial reef module for creating a feeding and shelter habitat for fish. The artificial reef module includes a column of vertically or horizontally arranged sheets of corrugated material. The corrugated channels of each sheet run transverse to the adjacent sheet, t hereby providing a system of complex channels and passageways within the module. Additionally, the flutes of one sheet may have a different height from the flutes of an adjacent sheet, thereby adding to the complexity of the passage system.

In U.S. Pat. No. 3,675,626, dated Jul. 11, 1972, Down disclosed a method of growing oysters on annular rings by first placing and vertically suspending the rings on a horizontal support in an oyster seed growing marine habitat, then suspending the rings horizontally on support lines in a vertical stack where the oysters grow to maturity.

In U.S. Pat. No. 5,370,476, dated Dec. 6, 1994, Streichenberger disclosed a low relief artificial reef made of one or more threads of automobile tires partially buried in a sedimentary bottom and partially protruding above it. The artificial reef can be built on land and conveyed floating to the site of installment. It can also be built on a boat and dropped directly onto the water bottom.

In U.S. Pat. No. 4,130,994 dated Dec. 26, 1978, Van Moss, Jr., disclosed a means to produce an artificial reef or floating breakwater wherein a series of buoyant disks are strung on a buoyant flexible line in spaced relation to each other with the lower end of the line being tethered to its own anchor. These tethered disks are placed preferably in about 6 to 18 feet water depth from the shoreline. A series of these disk-anchors are strung along in or out of lines paralleling the shoreline and in various depths of water to provide effective grid means for eliminating or at least substantially reducing the erosion effect along shoreline resulting from wave action. The placement of the disk rope anchor units is preferably in the water paralleling the shoreline and each unit is spaced apart from the other. However, the spacing is not critical but to accomplish the results sought to be achieved, the spacing ought to be close enough to be effective and yet not tangle with each other. Also several rows of the units may be employed in staggered relationship with each row, and the units may be removed at will.

In U.S. Pat. No. 5,213,058, dated May 25, 1993, Parker et al., disclosed an artificial stone crab habitat constructed of used pneumatic tire casings which are modified to allow easy access for harvesting and cleaning operations. Multiple tire casings are stacked and tethered together with a rope or cable harness.

While these artificial reef systems may be suitable for the purposes for which they were designed, they would not be as suitable for the purposes of the present invention, as hereinafter described.

SUMMARY OF THE INVENTION

The present invention discloses an artificial reef system having a plurality of tire casings tethered onto a cable-like line which reef system is supported in an upright position by a flotation device at its top end and which artificial reef system is anchored to the bottom of the ocean by another tire casing filled with concrete having an anchoring device disposed on its underside. The cable-like line may be monofilament. The reef system of tire casings is disposed upwardly due to the buoyancy of the flotation means and is free to move with the current in a natural manner to the extent that the cable-like line allows. The flotation means may have a rigid wall so that it maintains its surface displacement when subjected to underwater pressure.

An object of the present invention is to provide an artificial reef system for a habitat for sea life. A further object of the present invention is to allow for the use of tire casings to form the artificial reef system. A further objective of the present invention is to allow for the use of used tire casings to form the reef system so as to dispose of the used tires which otherwise cause an environmental hazard. A further object is to provide a flotation device which has rigid walls so that the surface displacement and buoyancy is maintained at a deep water depth.

The foregoing and other objects and advantages will appear from the description to follow. In the description reference is made to the accompanying drawings, which form a part hereof and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. Thus, the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 3 is a perspective view of the present invention.

LIST OF REFERENCE NUMERALS

Figure 1:
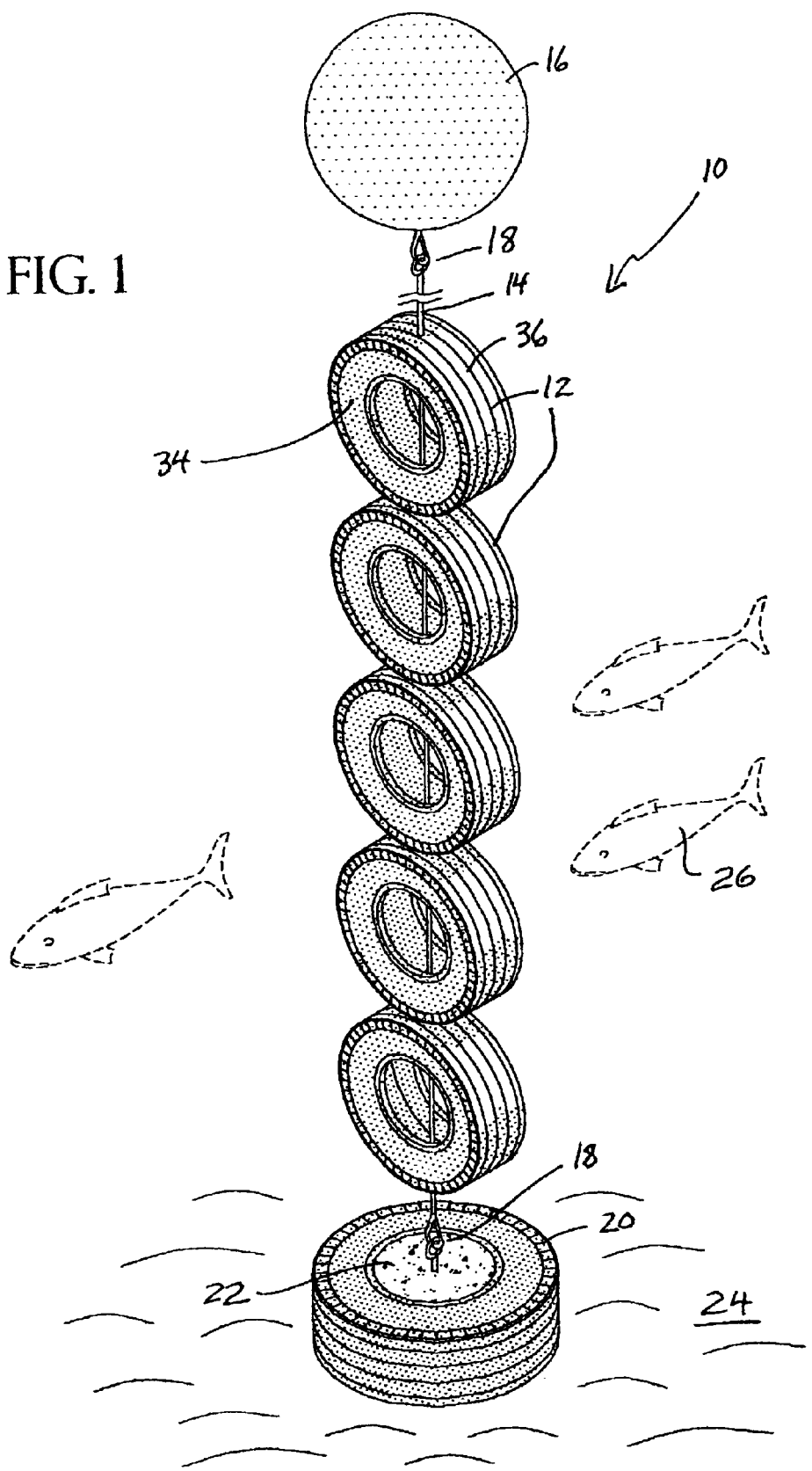
FIG. 1 is a perspective view of the present invention.

With regard to reference numerals used, the following numbering is used throughout the drawings.

10 present invention
12 tire casing
14 line
16 flotation device
18 connecting means
20 tire casing
22 concrete
24 floor
26 fish
28 anchor device
30 shaft
32 concrete anchoring means
34 sidewall
36 treadwall
38 straight section
40 elbow
42 group of vertical tires
44 horizontal tire
46 tie

DESCRIPTION OF THE PREFERRED EMBODIMENT(S)

Figure 2:
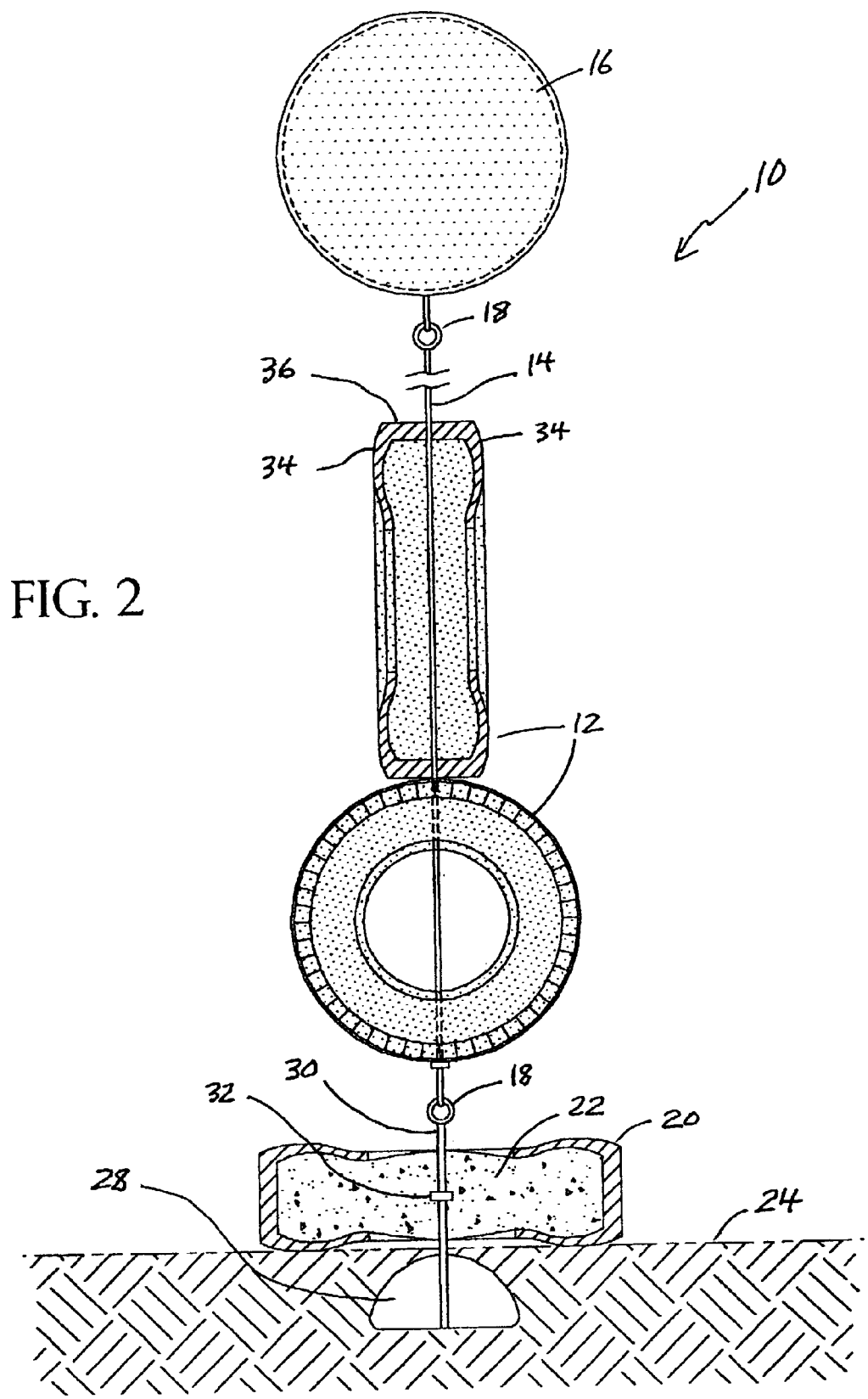
FIG. 2 is a cross sectional view of the present invention.

In order that the invention may be more fully understood, it will now be described, by way of example, with reference to the accompanying drawing in which FIGS. 1 through 2 illustrate the present invention wherein an artificial reef system is disclosed.

Turning to FIG. 1, therein is shown a perspective view of the present invention 10 in operative connection. Shown therein are a plurality of tire casings 12 disposed on a cable-like tether or line 14 having connected to the upper end thereof a flotation device 16. At the lower end of the line 14 is another tire casing 20 filled with concrete 22 to prevent the apparatus from shifting in the currents. Many types of heavy objects, e.g., steel or iron, could be used to replace the tire casing 20. Connecting means 18 are shown for connecting the line at its upper end to the flotation device and at its lower end to the concrete filled tire 22. The line of tires is suspended off the floor 24 in an upward standing manner due to the upward pull of the flotation device 16. The line of tires is also free to move in the current of the water body in a normal manner. Also shown is the floor 24 of the body of water wherein the present invention 10 is being used along with fish 26 which are distributed throughout the water column wherein the present invention 10 is suspended. The tires 12 have a pair of sidewalls 34 which are connected by a treadwall 36 in a conventional fashion. The line 14 runs through a first treadwall 36 or side of a tire and then through the opposite treadwall which cuts passes through the approximate center of the tire 12.

Turning to FIG. 2, therein is shown a cross section of the present invention 10 showing the tires 12 along with the line 14 having a flotation device 16 for holding the line upward with connecting means 18 for connecting the line to the flotation device and at the low end connecting the line to a tire 20 having concrete 22 therein Also shown is the floor 24 of the water body. The flotation device 16 could be made of Styrofoam or an air containing enclosure. Also shown is an anchoring device 28 which has a shaft 30 disposed thereon which runs from the anchoring device 28 to the lower connecting means 18 and which passes through the center of the concrete 22 having a concrete anchoring means 32 disposed internal therein. Shaft 30 runs generally perpendicular to the sidewalls of the tire. The tire casing 20 has an interior area filled with concrete 22 which area is defined by the pair of sidewalls, the treadwall and the center opening of the casing 20 which opening would normally be occupied by a steel rim when the tire casing is normally used on a vehicle. The line 14 can be made of a metal material such as a cable, or, monofilament or the like for durability and corrosion resistance. The tires 12 have a pair of sidewalls 34 which are connected by a treadwall 36 in a conventional fashion. The line 14 runs through a first treadwall 36 side of a tire and then through the opposite treadwall which line extends across the approximate center of the tire 12.

Turning to FIG. 3, therein is shown a configuration of the present invention 10 wherein the flotation device 16 is made of a rigid plastic air enclosure which may use multiple sections of PVC pipe or the like having a plurality of straight sections 38 joined together by a plurality of elbow sections 40. This could form a flotation device having various shapes having rigid walls, which walls would not compress underwater but instead would retain its surface air displacement capacity, and, likewise its buoyancy, regardless of the water depth in which it is placed. The tire casings 12 alternate between a group of a plurality of; e.g., three, vertically oriented tires 42 and at least one horizontally oriented tire 44 wherein the tire casing 12 are tied together at 46 by a line made of suitable material. Also shown is line 14 which runs from the anchor tire 20 to the flotation device 16 and thus connects the tire casings 42, 44 to the flotation device 16. The end of line 14 may simply be tied to the flotation device 16 as shown. Note that the length of the vertical group of tires 42 is about the same length as the diameter of the horizontal tire 44 in order to provide stability. Many types of heavy objects, e.g., steel, iron or concrete could be used to replace tire casing 20. Line 14 may pass through the treadwalls 36 of the vertical group 42 of the tires or between the sidewalls 34 of the tires 12.

What is claimed is:

1. An apparatus for forming an underwater artificial reef system for suspension on the floor of a water body, comprising:
    a) a plurality of tire casings, said casings having a pair of sidewalls connected by a treadwall, said treadwalls having a first side and a second side, wherein said first side of said casing is disposed substantially opposite said second side of said casings;
    b) a line which connects said plurality of casings, said line having a first end and a second end, wherein said line passes through a first side of each said casing and then a second side of each said casing;
    c) a floatation device disposed on said first end of said line to permit the suspension of said line having said tire casings disposed thereon;
    d) means for anchoring said second end of said line to the floor of a water body to permit the apparatus to be secured thereto, wherein said means for anchoring comprises a tire casing, said tire casing having an interior defined by a pair of sidewalls, a treadwall and a center opening of said casing said opening being normally occupied by a steel rim when the tire casing is normally used on a vehicle, concrete, said concrete being cured, said concrete being disposed in said interior area of said tire casing, a shaft disposed in said concrete, said shaft being disposed in a plane perpendicular to said pair of sidewalls, said shaft having a first end and a second end, said first end of said shaft being connected to said line and, an anchor disposed on said second end of said shaft for disposition in the floor of a water body; and,
    e) means for connecting said first end of said line to said flotation device and said second end of said line to said means for anchoring.

2. The apparatus of claim 1, wherein said flotation device may be made of Styrofoam.

3. The apparatus of claim 1, wherein said flotation device may be made of an air-containing enclosure.

4. The apparatus of claim 1, wherein said line may be made of a metal cable.

5. The apparatus of claim 1, wherein said line may be made of monofilament.

6. The apparatus of claim 1, wherein said means for connecting comprises an eye bolt, said line being tied to said eye bolt.

7. The apparatus of claim 1, further comprising a concrete anchor means being disposed on said shaft, said concrete anchor means being disposed internal said concrete.

8. An apparatus for forming an underwater artificial reef system for suspension on the floor of a water body, comprising:
    a) a plurality of tire casings, said casings having a pair of sidewalls connected by a treadwall, said treadwalls having a first side and a second side;
    b) wherein said plurality of tire casings alternatively comprise a group of a plurality of vertically disposed tires separated by a horizontally disposed tire, wherein said plurality of tire casings are tied together;
    c) a line which connects said plurality of casings, said line having a first end and a second end;
    d) a flotation device disposed on said first end of said line to permit the suspension of said line having said tire casings disposed thereon wherein said flotation device comprises plastic pipe having a rigid wall, wherein said pipe maintains its surface displacement when subjected to underwater pressure;
    e) an anchor for anchoring said second end of said line to the floor of a water body to permit the apparatus to be secured thereto; and,
    f) wherein said first end of said line is connected to said flotation device and said second end of said line is connected to said anchor.

9. The apparatus of claim 8, wherein said plastic pipe comprises PVC pipe having rigid walls.

10. The apparatus of claim 9, wherein said anchor comprises:
    a) a tire casing, said tire casing having an interior defined by a pair of sidewalls, a treadwall and a center opening of said casing said opening being normally occupied by a steel rim when the tire casing is normally used on a vehicle;
    b) concrete, said concrete being cured, said concrete being disposed in said interior area of said tire casing;
    c) a shaft disposed in said concrete, said shaft being disposed in a plane perpendicular to said pair of sidewalls, said shaft having a first end and a second end, said first end of said shaft being connected to said line; and,
    d) an anchor disposed on said second end of said shaft for disposition in the floor or a water body.

11. The apparatus of claim 10, further comprising a concrete anchor means being disposed on said shaft, said concrete anchor means being disposed internal said concrete.

12. The apparatus of claim 8, wherein the length of said plurality of vertically disposed tires is about the same as the diameter of said horizontally disposed tires so as to provide stability to the apparats.

* * * * *